US006213695B1

(12) United States Patent
Breitenmoser

(10) Patent No.: US 6,213,695 B1
(45) Date of Patent: Apr. 10, 2001

(54) AUTOMATIC SPINDLE ARRESTING DEVICE

(75) Inventor: Armin Breitenmoser, Wattwil (CH)

(73) Assignee: CEKA Elektrowerkzeuge AG & Co. KG, Wattwil (CH)

( * ) Notice: Subject to any disclaimer, the term of this patent is extended or adjusted under 35 U.S.C. 154(b) by 0 days.

(21) Appl. No.: 09/384,733

(22) Filed: Aug. 27, 1999

(30) Foreign Application Priority Data

Aug. 28, 1998 (EP) .......................... 98116378

(51) Int. Cl.[7] .................. B23C 9/00; B24B 45/00; B23B 31/08

(52) U.S. Cl. .................. 409/231; 173/178; 408/239 R; 409/232; 451/344

(58) Field of Search .................. 409/231, 234, 409/232; 408/239 R, 710, 239 A, 240, 6; 192/150; 173/178, 176; 310/388, 78; 451/342, 344; 30/388

(56) References Cited

U.S. PATENT DOCUMENTS 4,407,615 * 10/1983 Kulhmann .................. 409/234 X
4,489,525 * 12/1984 Heck .................. 408/710 X
4,650,375 * 3/1987 Millsap .................. 408/6
4,758,754 * 7/1988 Fink et al. .................. 310/78
4,915,555 * 4/1990 Smothers .................. 408/240
5,022,188 * 6/1991 Borst .................. 451/342
5,263,283 * 11/1993 Rudolf et al. .................. 451/344
5,430,944 * 7/1995 Shilling .................. 30/388
5,564,872 * 10/1996 Veil .................. 409/234
5,709,275 * 1/1998 Neumaier .................. 173/178 X

FOREIGN PATENT DOCUMENTS 44 45 597 A1 6/1996 (DE) .
44 45 598 A1 8/1996 (DE) .
297 15 257 01 U 1/1998 (DE) .
0244203A 11/1987 (EP) .
0 761 350 A1 3/1997 (EP) .

* cited by examiner

*Primary Examiner*—William Briggs
(74) *Attorney, Agent, or Firm*—Darby & Darby

(57) ABSTRACT

An automatic spindle arresting device for hand tools, especially for drills, drill screwdrivers, angle grinders and the like, with a latching part (50; 120), which is connected to the spindle (20) or the housing (10) so that there cannot be any mutual rotation, and which can be coupled in both direction of rotation of the spindle (20) with at least one arresting part (40; 140), which is connected with the housing (10) or the spindle (20) so that there cannot be any mutual rotation, and with a driving part (34; 110), which is disposed equiaxially to the spindle (20) and has unlocking elements, by means of which the latching part (50; 120) and the arresting part (40; 140) can be uncoupled, is characterized in that the unlocking elements are one or more control paths (38; 116), which are disposed at the driving part (34; 110) and at which one or more control cams (54; 124) of the latching part (50; 120) slide due to a rotational motion of the driving part (34; 110) in such a manner, that the latching part (50; 120) and the arresting part (40; 140) can be uncoupled by an axial shifting either of the latching part (50; 120) and/or of the arresting part (40; 140).

15 Claims, 4 Drawing Sheets

AUTOMATIC SPINDLE ARRESTING DEVICE

FIELD OF THE INVENTION

The invention relates to an automatic spindle arresting device, for hand tools especially for drill screwdrivers, angle grinders and the like.

BACKGROUND OF THE INVENTION

The DE 297 15 257 U1 discloses a driving device for a spindle of a motor-driven, hand-guided working tool, especially a drilling or impact screwdriver, with a driving part, which is connected with the spindle, so that there cannot be mutual rotation, and which can be coupled in both directions of rotation of the spindle over clamping bodies in the form of rollers of a free-wheel with a ring, which is fastened to the housing, with a driving part, which is disposed equiaxially to the spindle and has unlocking elements, which interact with the rollers, which act as clamping bodies and, when the driving part is driven, release the clamping bodies so that the driving part is uncoupled from the ring fastened to the housing and can be rotated, and with torque-transmnitting driving surfaces being provided at the driving part and the driving part for driving the spindle by motor, in the neutral position of the driving part the distance between the driving surfaces being larger than the distance between the unlocking element and the assigned clamping body. In the case of this driving device, the driving part has claws, which are spatially separated from the unlocking element and protrude into the driving part, the surfaces of the claws and of the driving openings, which face one another in the respective direction of rotation, forming the torque-transferring driving surfaces. For the driving device, a total of six clamping bodies in the form of balls are provided. The construction of such an automatic spindle arresting device or driving device is very expensive. As a result, the installation is very expensive and costly since, aside from the driving part and the driving part, six clamping bodies must be installed. Considering the large number of moving parts, malfunctions, breakdowns and defects in the spindle arresting device cannot be excluded.

Furthermore, the EP 0 761 350 A1, for example, also discloses a spindle arresting device, the construction of which is expensive.

Furthermore, DE 44 45 597 A1 and DE 44 45 598 A1 disclose spindle 1 arresting devices in the form of adapters. These also have a relatively complicated construction.

OBJECT OF THE INVENTION

It is an object of the invention to develop an automatic spindle arresting device for hand tools of the generic type further in such a manner, that they comprise the least possible number of individual parts, can be produced in a simple manner and, as far as possible, are not susceptible to breakdowns and are resistant to wear.

SUMMARY OF THE INVENTION

This objective is accomplished pursuant to the invention for an automatic spindle arresting device for hand tools of the type described above by the distinguishing features of claim 1.

Owing to the fact that the unlocking elements comprise one or more control curves disposed at the driving part and one or more control cams sliding along the control curves by a rotational movement of the driving part in such a manner, that the latching part and the arresting part can be uncoupled by axially shifting the latching part and/or the arresting part, an automatic spindle arresting device is made possible, which functions reliably, has a simple structure and therefore is manufactured easily, and is resistant to wear.

As far has the construction of the arresting part, the driving parts and the latching part is concerned, different constructions are conceivable in principle.

In the case of an advantageous embodiment, provisions are made so that the arresting part is disposed attached to the housing, provided with openings, and disposed concentrically to the spindle, it being possible to engage locking cams, disposed on the than latching part, by shifting the latching part axially. Such an arresting part, which is provided with openings, can be produced simply and installed easily in the housing.

Moreover, provisions can also be made so that the arresting part is formed in one piece with the housing. In this case, additional installation of the arresting part can be omitted completely.

Preferably, moreover, provisions are made so that the openings in each case are disposed offset by the same angle in the arresting part. This enables the spindle to be arrested quickly in both direction of rotation Likewise, provisions are advantageously made so that the arresting cams and the control cams are disposed in each case consecutively on the latching part, being offset by the same angle as the openings in the arresting part.

The arresting part advantageously is disposed, so that it can be shifted axially on the spindle against a restoring force of a restoring spring, acting in the direction of the arresting part. By means of these restoring springs, it is ensured that, when the hand tools is at rest, the arresting cams, disposed on the latching part, engage the openings of the arresting part.

In the case of a different, advantageous embodiment, which can be used especially with hand tools with a planetary gearing and a torque coupling, provisions are made so that the arresting between the housing and the arresting part is brought about by a latching part assigned to the housing.

The arresting part is, for example, a planet carrier of a planet gearing.

The driving element preferably is an internal gear of the planet gearing.

Advantageously, provisions are made so that the openings are disposed at always the same angle in the planet carrier. By these means, rapid arresting is made possible in both direction of rotation of the spindle.

The arresting cams and the control cams are disposed consecutively at the latching part, being offset by the same angle as the openings in the planet carrier.

The axially displaceable latching part advantageously is disposed at the housing so that that it cannot rotate relative to the housing and, moreover, against a restoring force of a restoring spring, acting in the direction of the planet wheel. By means of these restoring springs, it is ensured that the arresting cams, disposed on the latching part, engage the openings of the planet wheel, acting as arresting part, when the hand tool is stopped.

In the case of a hand tool machine, which has a torque coupling, provisions are advantageously made so that the internal gear is part of a torque coupling, the periodicity of the clamping bodies of the torque coupling corresponding to the periodicity of the control paths or control cams.

The control paths, disposed on the driving part, can be limited by a unilateral stop. In this way, a precise disengagement of the arresting part from the driving part and the reverse are realized and an unwanted, renewed engagement of these two parts is avoided.

The control paths themselves can be constructed in different ways. One embodiment, which is particularly advantageous with respect to its manufacture, makes provisions so that the control paths have a basic surface, an essentially flat inclined surface with an inclination disposed in the axial direction and a flat plateau surface, which adjoins the inclined surface and extends perpendicularly to the axial direction.

BRIEF DESCRIPTION OF THE DRAWINGS

Further advantages and distinguishing features are the object of the following description as well as of the diagrammatic representation of a few examples. In the drawing

DETAILED DESCRIPTION OF THE INVENTION

Figure 1:
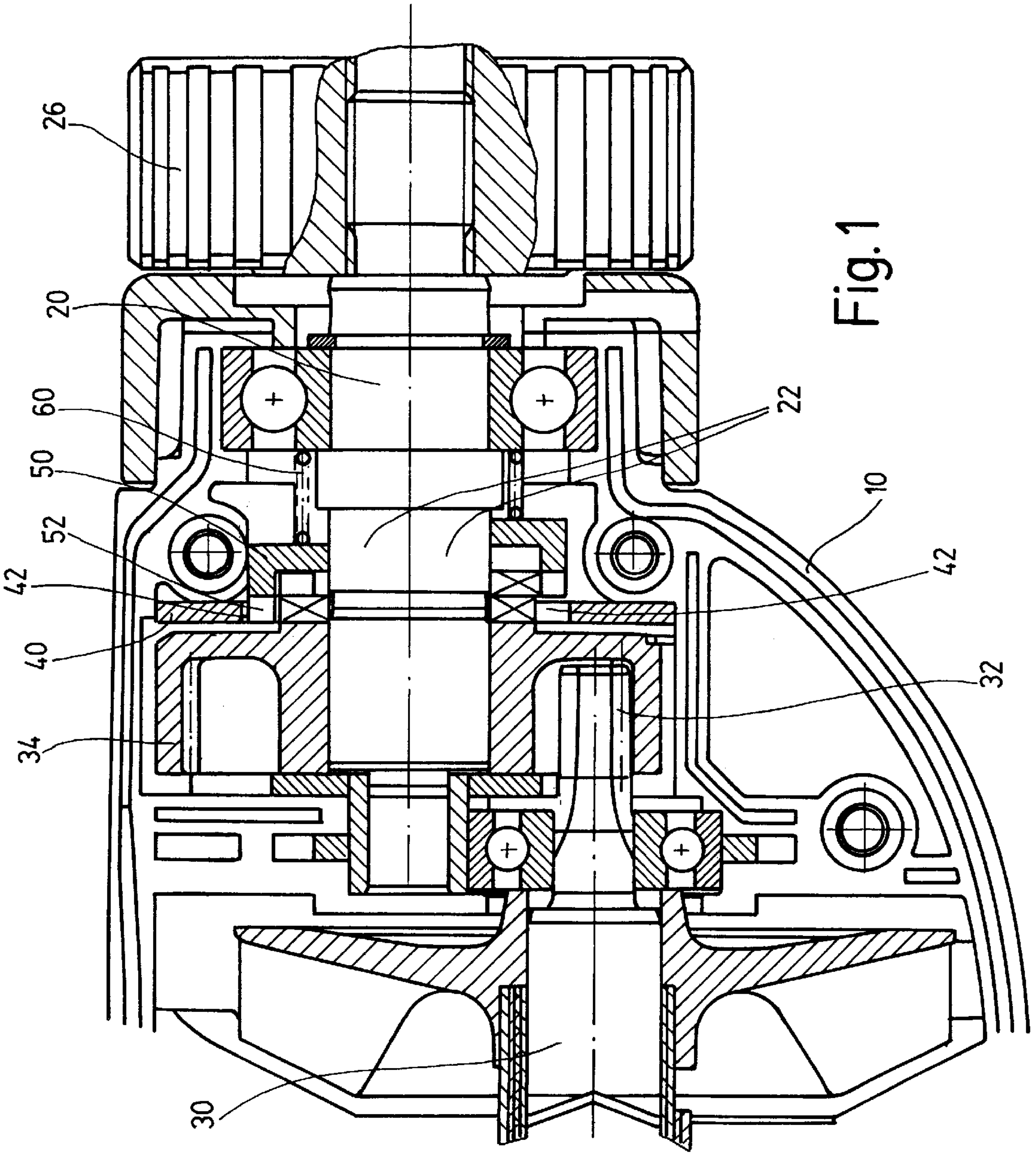
FIG. 1 shows a partially truncated partial sectional representation of the front part of a hand tool machine with an inventive, automatic spindle arresting mechanism.

A hand tool, such as a drill, the front part of which is shown in FIG. 1, comprises a housing 10, in which a spindle 20 is rotatably mounted. The spindle 20 is driven by a drive shaft 30 of a (not shown) motor over an internal gear 34, which is constructed as driving part and connected to the spindle 20 so that there cannot be any relative rotation. For this purpose, the driving shaft 30 of the motor is provided at its front end with gearing 32, which engages the gearing of the internal gear 34.

Aside from the internal gear 34, an automatic spindle arresting device comprises an arresting part 40, which is fastened to the housing and is in the form of an arresting disk, and a latching part 50, which can be shifted axially, against the restoring force of a restoring spring 60, onto multi-sided, beveled sliding surfaces 22 of the spindle 20 in the region of the latching part 50. The spindle 20 is intended to accommodate a (not shown) tool, such as a drill, which can be fastened by means of a rotatable clamping element 26 in a spindle opening.

Figure 4:
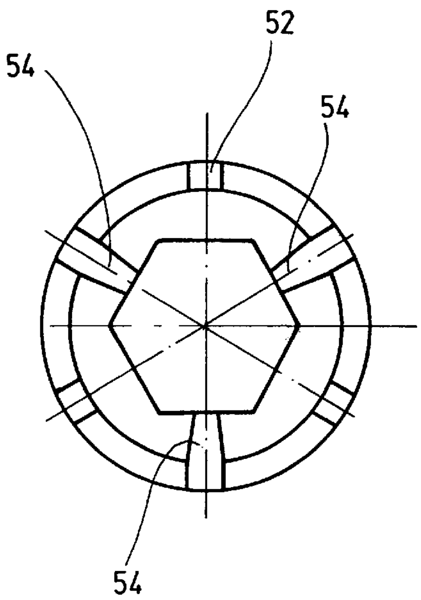
FIG. 4 shows a plan view of the latching part shown in FIGS. 1 to 3.

The mode of functioning of the automatic spindle arresting device, formed from the internal gear 34, the arresting part 40 and the latching part 50, is described in the following in conjunction with FIGS. 2, 3 and 4.

Figure 2:
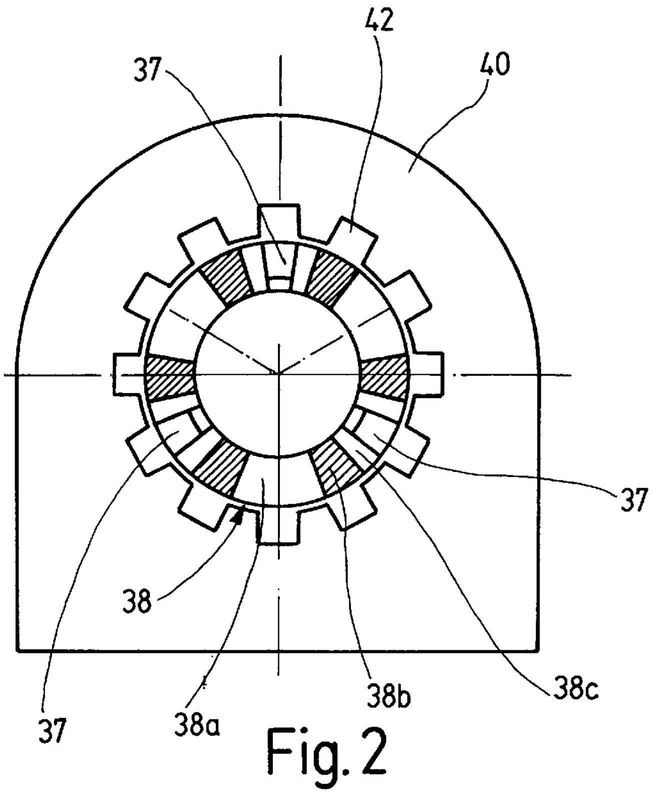
FIG. 2 shows a representation of the arresting part and of the latching part.

When the drill is not running, arresting cams 52, disposed on the latching part 50, engage openings 42, which are provided in the arresting part 40, which is constructed as an arresting disk, as shown in the upper half of FIG. 1 and in FIG. 2. The openings 42 of the arresting part 40, as well as the locking cams 52 on the latching part 50 are disposed offset periodically to one another by the same, preferably small angles, by means of which rapid engagement of the automatic spindle arresting device becomes possible when the spindle 20 is rotating in its two directions of rotation.

In order to bring about the normal operating state, that is, a drilling or screwdriving operation of the hand tool, control cams 54, which are disposed on the latching part 50, slide on control paths 38, which are provided on the internal gear 34 on the side of the latter facing the latching part 50, in such a manner, that the latching part 50 carries out an axial motion against the restoring force of the spring 60, that is, away from the internal gear 34. At the same time, the control paths 38 and the control cams 54 interact in such a manner, that an axial motion takes place to the extent that the arresting cams 52 are disengaged from the openings 42 in the arresting disk 40. Such a disengagement occur in both of the directions of rotation of the spindle 20. In this disengaged state, the spindle 20 is driven by die internal gear 34 by means of the drive shaft 30 and can rotate freely. This state is shown in FIG. 1 in the lower half.

In order to fasten a tool in the accommodating spindle, the latching part 50 is rotated by rotating at the clamping element 26, the drive shaft 30 and, with that, the internal gear 34 being idle. Because of this rotational movement, the control cams 54, which are disposed on the latching part 50, slide on the control paths 38 along the internal gear 34, until the arresting cams 52 engage the openings 42 in the arresting disk 40 and the spindle 20 is in the arrested state of a rest, so that, by rotating the clamping element 26, opening and closing for fastening or removing a drilling tool is possible.

Figure 3:
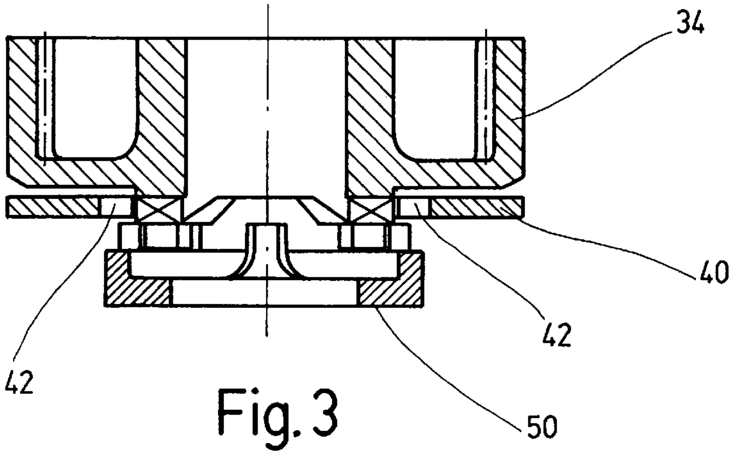
FIG. 3 shows a side view of the driving part, the latching part and the arresting part, shown in FIG. 1.

As shown particularly in FIGS. 2 and 3, the control paths 38, disposed on the internal gear 34, have a basic surface 38*a*, an essentially flat inclined surface 38*b*, with an inclination disposed in the axial direction, and a flat plateau surface 38*c*, which adjoins the inclined surface 38*b* and extends perpendicularly to the axial direction. Between adjacent control paths 38, a stop cam 37 for the control cams 54 can be provided (FIG. 2). In this position, the axial displacement of the latching part 50 is a maximum. The arresting cams 52 are disengaged completely from the openings 42 of the arresting part 40.

Figure 5:
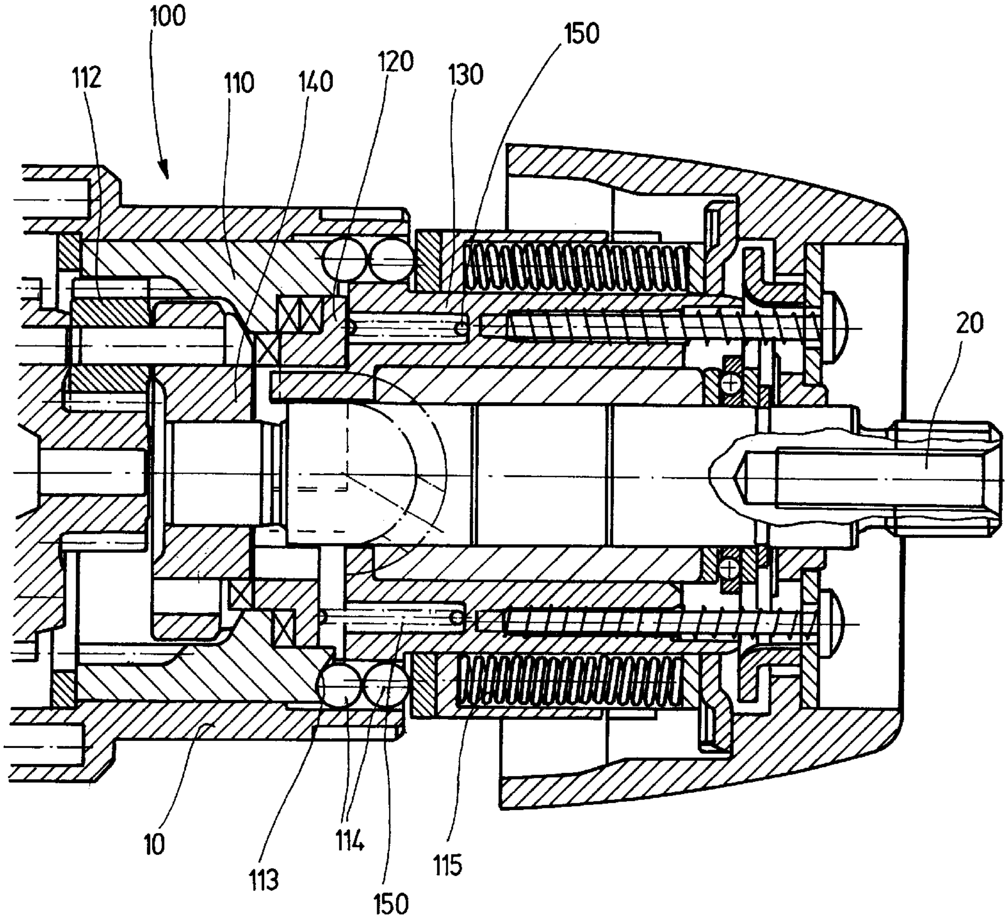
FIG. 5 shows a partially truncated partial sectional representation of a drilling screw driver with a further embodiment of an inventive spindle arresting device and FIG. 6 shows a detailed sectional representation as well as plan views of the latching part, the power take-off part and the automatic arresting part of the automatic spindle arresting device shown in FIG. 5.

In the case of a further embodiment, which is shown in FIG. 5, an automatic spindle arresting device, which is used particularly for drilling screwdrivers, the driving element is constructed as an internal gear to 110 of a planetary gearing 100. This internal gear 110 is driven in a known manner over a planet wheel 112.

Figure 6:
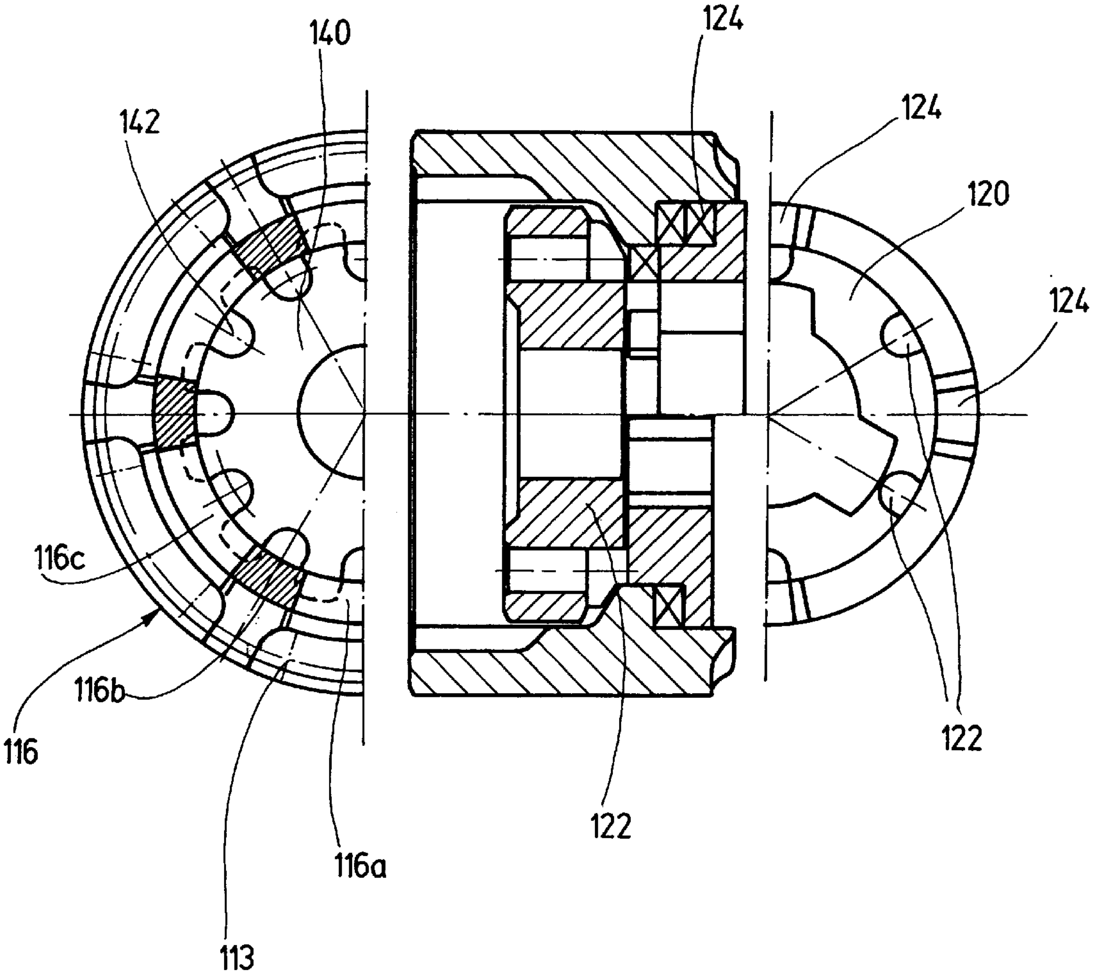

For this embodiment, the latching part 120 is assigned non-rotationally to the housing 10, which is provided with the projections 130, and, on its side facing the driving part 110, has arresting cams 122 and control cams 124, as can be seen, particularly, in FIG. 6.

A planet carrier 140, which acts as an arresting part and has openings 142, which in each case are mutually offset by the same angle, is disposed concentrically to the internal gear 110. The openings 142 and the arresting cams 122 are offset on the planet carrier 140 as well as on the latching part 120 in each case by the same angle to one another, so that an engagement of the arresting cams 122 of the latching part 120 in the openings 142 of the planet carrier 140 is possible.

On its front side, the internal gear 110 furthermore has guided paths for clamping bodies 114, which are pressed against the restoring force of a restoring spring 115 onto one another or onto the guiding path 113. A known torque coupling is realized in this way, the guiding paths 113 being disposed periodically on the internal gear 110 in such a manner that, depending on the adjustable force of the restoring spring 115, torque transfer is possible.

The details of this torque coupling, which is not an object of the present invention, are not dealt with further. It is, however, an important distinguishing feature that the periodicity of the guiding paths 113 is identical with periodicity of control paths 116, which are provided at the internal gear (see FIG. 6, left half). These control paths 116 comprise a flat, basic surface 116*a,* a flat surface of inclination 116*b* in the circumferential direction and a further flat plateau surface 116*c,* which is disposed axially offset relative to the basic surface 116*a* in the direction of the latching part 120.

The function of the automatic spindle arresting device, shown in FIGS. 5 and 6, is described in the following. It should be noted that the not arrested state of the spindle is shown in each case in the upper half of FIGS. 5 and 6 and the arrested state, the state of rest, is shown in the lower half.

To bring about the normal operating state, that is, while drilling or screwing, the control cams 124 of the latching part 120, guided axially displaceably on projections 130, slide against the restoring force over the restoring spring 120 over the inclined surface 116*b* onto the plateau surface 116*c* and, in this way, bring about an axial displacement of the latching part 120. The inclination of the inclined surfaces 116*b* is designed so that axial shifting of the latching part 120 results to such an extent, that the arresting cams 122 are disengaged from the openings 142 of the planet wheel 140. In this state, which is shown in the lower half in FIG. 5, the spindle 20 is driven by the motor.

For clamping a tool while the motor is stationary, the latching part 120 is carried along by rotating at a clamping element 190 in such a manner, that the control cams 124 slide in the opposite direction from the plateau surface 116*c* over the inclined surface 116*b* onto the basic surface 116*a,* in which the arresting cams wanted to engage the openings 142 of the planet wheel 140. In this state, the spindle 20 is arrested and tools, such as drills or screwing tools can be fastened, in seats provided for this purpose, by rotating the clamping element 190.

What is claimed is:

1. An automatic spindle arresting device for use in connection with hand tools of the type including a spindle rotatable in two directions and a housing, a latching part having at least one control cam connected to one of said spindle or said housing, and an arresting part connected with the other of said spindle or said housing and adapted to couple with said latching part to prevent relative rotation there between, and a driving part disposed equiaxially to said spindle and having unlocking elements for uncoupling said latching part and said arresting part, characterized in that said unlocking elements comprise at least one control path which is disposed at said driving part, said at least one control cam adapted to slide on said unlocking elements due to rotational motion of the driving part whereby the latching part and the arresting part are uncoupled by an axial shifting of at least one of said latching part and said arresting part.

2. The automatic spindle device of claim 1, characterized in that the arresting part (40) is fastened to the housing, provided with openings 42 and disposed concentrically to the spindle, arresting cams (52) disposed on the latching part (50), said arresting cams being able to engage the openings (42) due to the axial shifting of the latching part (50).

3. The automatic spindle device of claim 2, characterized in that the arresting part (40) is constructed in one piece with the housing (10).

4. The automatic spindle device of claim 2, characterized in that the openings (42) are disposed in the arresting part (40) offset in each case by the same angle.

5. The automatic spindle arresting device of claim 2, and a plurality of control cams, characterized in that the arresting cams (52) and the control cams (54) are disposed in each case consecutively on the latching part (50), being offset by the same angle as the openings (42) in the arresting part (40).

6. The automatic spindle arresting device of claim 1, characterized in that the latching part (50) is disposed axially displaceable on the spindle (20) against a restoring force of a restoring spring (60) acting in the direction of the arresting part (40).

7. The automatic spindle arresting device of claim 1, characterized in that the latching part (120) is fastened to the housing and, aside from the at least one control cam, has arresting cams (122) which, by axially shifting the latching part (120), can engage openings, which are provided complementarily to them in the arresting part (140).

8. The automatic spindle arresting device of claim 1, characterized in that the arresting part is a planet carrier (140) of a planetary gearing.

9. The automatic spindle arresting device of claim 7, characterized in that the driving element (110) is an internal gear of the planetary gearing.

10. The automatic spindle arresting device of claim 8, and openings in said planet carrier, characterized in that the openings (142) are disposed offset in each case by the same angle in the planet carrier (140).

11. The automatic spindle arresting device claim 7, characterized in that the arresting cams (22) and the control cams (124) are disposed consecutively on the latching part (120), being offset by the same angle as the openings (142) in the planet carrier (140).

12. The automatic spindle arresting device claim 7, characterized in that the latching part (120) is disposed so that it cannot be rotated relative to the housing (10) and can be shifted against a restoring force of a restoring spring (150) acting in the direction of the planet carrier (140).

13. The automatic spindle arresting device of claim 7, and a torque coupling having an internal gear, characterized in that the periodicity of tracks of clamping bodies (113, 114) of the torque coupling corresponding to the periodicity of the at least one control path or the at least one control cam.

14. The automatic spindle arresting device of claim 1, characterized in that the control paths (30) are limited by a unilateral stop.

15. The automatic spindle arresting device of claim 1, characterized in that the control paths (38; 116) have a basic surface (38*a;* 116*a*), an essentially flat inclined surface (38*b;* 116*b*) with an inclination, which is disposed in the axial direction, and a flat plateau surface (38*c;* 116*c*), which adjoins the inclined surface and extends perpendicularly to the axial direction.

* * * * *